Sept. 21, 1954  R. G. EMRICK  2,689,741
ADJUSTABLE COMPENSATING CHUCK
Filed Aug. 23, 1952

INVENTOR
ROBERT G. EMRICK
BY
ATTORNEY

Patented Sept. 21, 1954

2,689,741

UNITED STATES PATENT OFFICE 2,689,741

ADJUSTABLE COMPENSATING CHUCK

Robert G. Emrick, New York, N. Y.

Application August 23, 1952, Serial No. 305,984

10 Claims. (Cl. 279—82)

This invention relates to chuck devices for attachment of taps and similar tools to tapping attachments, multiple tapping heads and similar apparatus. More particularly, the invention deals with a chuck device having means for adjustably coupling the chuck on a spindle for positioning a tool with respect to a workpiece. Still more particularly, the invention deals with a chuck device having yieldable means for supporting the tool holding insert of the device in the chuck body.

The novel features of the invention will be best understood from the following description, when taken together with the accompanying drawing, in which certain embodiments of the invention are disclosed and, in which, the separate parts are designated by suitable reference characters in each of the views and, in which.

Figure 1:
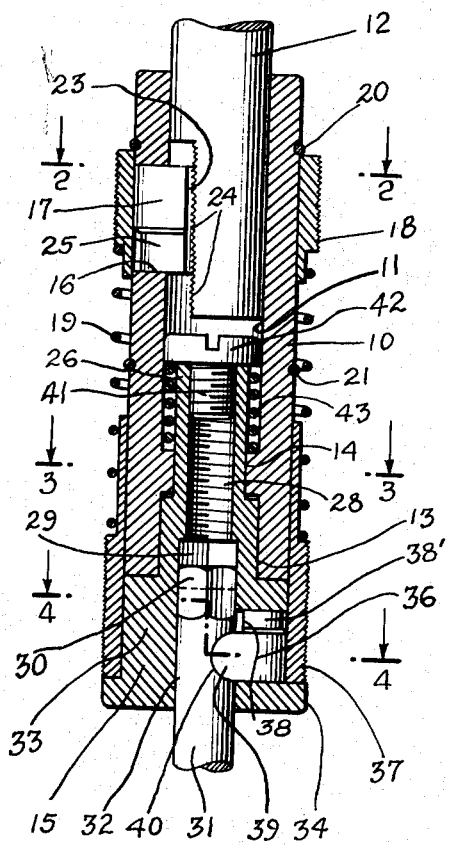
Fig. 1 is a longitudinal sectional view through a chuck device made according to our invention illustrating, in part, a spindle and tool and also showing parts in elevation.

In Fig. 1 of the drawing, I have indicated at 10 an elongated tubular chuck body having a long bore 11 opening through the upper end thereof and adapted to receive a drive spindle 12. The other end of the body has a short bore 13 of a diameter substantially similar to the diameter of the bore 11.

Figure 2:
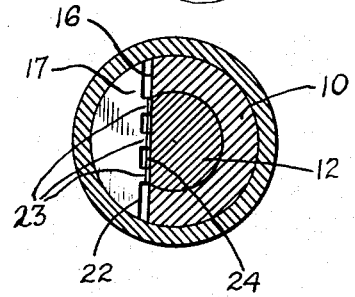
Fig. 2 is a section on the line 2—2 of Fig. 1.
Figure 3:
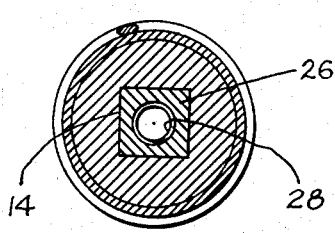
Fig. 3 is a section on the line 3—3 of Fig. 1.
Figure 4:
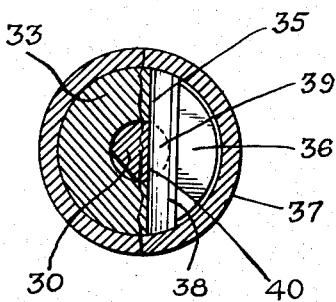
Fig. 4 is a section on the broken line 4—4 of Fig. 1.
Figure 5:
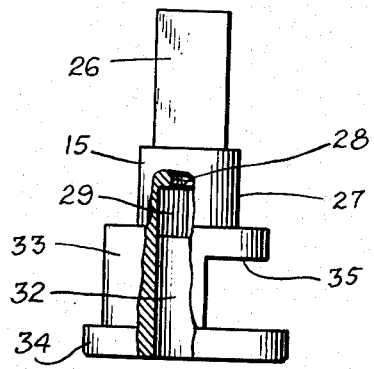
Fig. 5 is a side view of a detachable insert detached and with part of the construction broken away and in section.

Between the bores 11 and 13, the body has a reduced rectangular bore 14, note Fig. 3, to key a removable tool supporting insert 15 with respect to said body. The body 10 has a segmental opening 16 adjacent the upper end portion thereof, note Fig. 2, in which an adjustment key 17 is mounted for radial movement, the key being controlled by a milled sleeve 18, held by a coil spring 19 in engagement with a split stop ring 20 and movable against the action of the spring 19 to another stop ring 21.

The key 17 is generally crescent-shaped in form, having a flat inner surface 22, on which is arranged a series of vertically extending teeth 23. The teeth 23 are adapted to mesh with vertical teeth 24 on a cutaway flat surface of the spindle 12, as will clearly appear from a consideration of Figs. 1 and 2. The key 17 has a reduced lower portion 25, which allows the key to move outwardly to clear the teeth 24 in adjusting the body 10 in different positions on the spindle. It will be apparent, however, that the sleeve 18 retains the key against displacement from said body when the sleeve is in the lowered position engaging the reduced portion 25.

The tool supporting insert 15 has an upper reduced end portion 26 which is of rectangular form in cross-section to fit the bore 14, as clearly seen in Fig. 3, and this portion, as well as part of a collar portion 27, which fits in the bore 13, include a threaded bore 28. The lower end of the bore 28 opens into a rectangular key bore 29 adapted to receive the upper rectangular end 30 of a tap or other tool 31. The tool 31 fits freely into the key bore 29, as well as in the bore 32 which opens out through the lower end of the insert 15, this slight movement being provided for self-centering of the tool 31 with respect to a workpiece.

Below the collar 27, the insert 15 has a substantially cylindrical body portion 33 terminating at its lower end in a circumferential flange 34. One side of the bore portion 33 has a more or less crescent-shaped cutout 35 in which a tool key 36 is movably supported. The key 36 is held in operative position by a sleeve 37, generally similar to the sleeve 18, except for the size thereof. The spring 19 normally supports the sleeve 37 on the flange 34, whereas the stop ring 21 checks upward movement of the sleeve on the body 10, this latter position maintaining the lower end portion of the sleeve on an upwardly extending flange 38 of the key 36. The flange 38 forms a recess 38' on the top of the key 36 to receive the sleeve 37 in the outward movement of the key. This movement is sufficient to disengage the tool 31 and it is attached to a new tool whenever desired.

The inner end of the key 36 has a rounded key bar 39 fitting in a notch or recess 40 in the shank of the tool 31 in keying the tool against axial movement with respect to the chuck.

Mounted in the threaded bore 28 is a screw 41 having a large head 42 which fits snugly but freely in the bore 11 and sits firmly upon the upper end of the rectangular end portion 26 of the insert 15. The head 42 of the screw supports a spring 43 in the chamber around the portion 26 and in engagement with the upper surface of the reduced portion having the rectangular bore 14.

It will be apparent that the spring 43 provides relative movement of the insert 15, including the tool 31 coupled therewith with respect to the chuck body 10, which movement is desirable, particularly in the high speed withdrawal of a tap with respect to a workpiece.

By providing a tool supporting insert, such as the insert 15, it will be apparent that, after detaching the chuck with respect to the spindle 12, the screw 41 can be removed and the insert withdrawn and another insert substituted, which would have bores 29 and 32 of different sizes for the support of tools, such as the tool 31 of different sizes. The variance in tool sizes will depend entirely upon the general size of the chuck device and a reasonably large range will be provided with each of the different size chucks employed.

It will be apparent that, with different types of inserts, corresponding different keys, such as the key 36 will be employed. By reason of this construction, a great saving can be effected in tool costs by simply interchanging one of a number of different inserts with a single chuck body.

By providing the spaced axially extending teeth 23 on the key 17, minimum frictional engagement is provided between the key and the spindle in making adjustments and, at the same time, positive coupling engagement is maintained between the key and the spindle.

Having fully described my invention what I claim as new and desire to secure by Letters Patent is:

1. A chuck device comprising an elongated tubular body, means including a sleeve movable longitudinally of one end portion of the body for adjustably coupling said body on a drive spindle, a tool supporting insert keyed to and movable longitudinally of the other end portion of said body, a key movably supported in said insert adapted to engage a tool arranged therein to key the tool against movement axially of said insert, another sleeve movable longitudinally of said body and insert controlling said key, and tensional means engaging both of said sleeves for normally supporting the sleeves in operative position.

2. A chuck device comprising an elongated tubular body, means including a sleeve movable longitudinally of one end portion of the body for adjustably coupling said body on a drive spindle, a tool supporting insert keyed to and movable longitudinally of the other end portion of said body, a key movably supported in said insert adapted to engage a tool arranged therein to key the tool against movement axially of said insert, another sleeve movable longitudinally of said body and insert controlling said key, tensional means engaging both of said sleeves for normally supporting the sleeves in operative position, and said first named means including an adjustable key having teeth operatively engaging longitudinally spaced teeth on the spindle in adjustably fixing the chuck body on said spindle.

3. A chuck device comprising an elongated tubular body, means including a sleeve movable longitudinally of one end portion of the body for adjustably coupling said body on a drive spindle, a tool supporting insert keyed to and movable longitudinally of the other end portion of said body, a key movably supported in said insert adapted to engage a tool arranged therein to key the tool against movement axially of said insert, another sleeve movable longitudinally of said body and insert controlling said key, tensional means engaging both of said sleeves for normally supporting the sleeves in operative position, said first named means including an adjustable key having teeth operatively engaging longitudinally spaced teeth on the spindle in adjustably fixing the chuck body on said spindle, and the teeth of said key comprising a plurality of tooth sections arranged longitudinally with respect to the axis of said chuck body.

4. A chuck device comprising an elongated tubular body, means including a sleeve movable longitudinally of one end portion of the body for adjustably coupling said body on a drive spindle, a tool supporting insert keyed to and movable longitudinally of the other end portion of said body, a key movably supported in said insert adapted to engage a tool arranged therein to key the tool against movement axially of said insert, another sleeve movable longitudinally of said body and insert controlling said key, tensional means engaging both of said sleeves for normally supporting the sleeves in operative position, and said insert having a rectangular bore for receiving a rectangular end on a tool.

5. A chuck device comprising an elongated tubular body, means including a sleeve movable longitudinally of one end portion of the body for adjustably coupling said body on a drive spindle, a tool supporting insert keyed to and movable longitudinally of the other end portion of said body, a key movably supported in said insert adapted to engage a tool arranged therein to key the tool against movement axially of said insert, another sleeve movable longitudinally of said body and insert controlling said key, tensional means engaging both of said sleeves for normally supporting the sleeves in operative position, said insert having a rectangular bore for receiving a rectangular end on a tool, and said insert having a reduced elongated inner end portion of rectangular cross-sectional form operatively engaging a rectangular bore in said body in keying the insert to said body.

6. A chuck device comprising an elongated tubular body, means including a sleeve movable longitudinally of one end portion of the body for adjustably coupling said body on a drive spindle, a tool supporting insert keyed to and movable longitudinally of the other end portion of said body, a key movably supported in said insert adapted to engage a tool arranged therein to key the tool against movement axially of said insert, another sleeve movable longitudinally of said body and insert controlling said key, tensional means engaging both of said sleeves for normally supporting the sleeves in operative position, said insert having a rectangular bore for receiving a rectangular end on a tool, said insert having a reduced elongated inner end portion of rectangular cross-sectional form operatively engaging a rectangular bore in said body in keying the insert to said body, and means on said insert engaging a coil spring arranged in said body providing relative movement of the insert with respect to said body.

7. A chuck device comprising an elongated tubular body, means including a sleeve movable longitudinally of one end portion of the body for adjustably coupling said body on a drive spindle, a tool supporting insert keyed to and movable longitudinally of the other end portion of said body, a key movably supported in said insert adapted to engage a tool arranged therein to key the tool against movement axially of said insert, another sleeve movable longitudinally of said body and insert controlling said key, tensional means engaging both of said sleeves for normally supporting the sleeves in operative position, said insert having a rectangular bore for receiving a rectangular end on a tool, said insert having a reduced elongated inner end portion of rectangular cross-sectional form operatively engaging a rectangular bore in said body in keying the insert to said body, means on said insert engaging a coil spring arranged in said body providing relative movement of the insert with respect to said body, and said last named means comprising a headed screw engaging a threaded bore in said end of the insert.

8. A chuck device of the character described, comprising an elongated tubular body, means for coupling a drive spindle with one end portion of said body, a tool supporting insert detachable with respect to the other end portion of said body, means in said insert for keying a tool against displacement therefrom, a spring actuated sleeve slidably engaging said insert to retain said keying means in operative position, said insert checking movement of the sleeve in one direction, and means detachable with respect to the inner end of said insert controlling coupling and uncoupling of the insert with respect to said body.

9. A chuck device of the character described, comprising an elongated tubular body, means for coupling a drive spindle with one end portion of said body, a tool supporting insert detachable with respect to the other end portion of said body, means in said insert for keying a tool against displacement therefrom, means detachable with respect to said insert controlling coupling and uncoupling of the insert with respect to said body, said last named means comprising a headed screw in threaded engagement with said insert, and a coil spring disposed between the head of said screw and part of the chuck body for yieldably supporting the insert in said chuck body.

10. A chuck device of the character described, comprising an elongated tubular body, means for coupling a drive spindle with one end portion of said body, a tool supporting insert detachable with respect to the other end portion of said body, means in said insert for keying a tool against displacement therefrom, means detachable with respect to said insert controlling coupling and uncoupling of the insert with respect to said body, said last named means comprising a headed screw in threaded engagement with said insert, a coil spring disposed between the head of said screw and part of the chuck body for yieldably supporting the insert in said chuck body, and spring controlled sleeves slidably engaging the chuck body for controlling coupling of a chuck body with a spindle and coupling of a tool with said insert.

References Cited in the file of this patent

UNITED STATES PATENTS

| Number | Name | Date |
|---|---|---|
| 1,433,590 | Ziegler | Oct. 31, 1922 |
| 1,465,612 | Morse | Aug. 21, 1923 |
| 1,653,762 | Pegley et al. | Dec. 27, 1927 |
| 1,862,352 | Emrick | June 7, 1932 |